(12) United States Patent
Bernhardt et al.

(10) Patent No.: US 9,079,623 B2
(45) Date of Patent: Jul. 14, 2015

(54) REAR SPOILER DEVICE FOR A VEHICLE

(75) Inventors: Dirk Bernhardt, Wunstorf (DE);
Thomas Dieckmann, Pattensen (DE);
Werner Dreyer, Garbsen (DE); Ingo Stumberg, Hannover (DE); Christian Wiehen, Burgwedel (DE); Frank Zielke, Barsinghausen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/344,157

(22) PCT Filed: Jul. 18, 2012

(86) PCT No.: PCT/EP2012/003018
§ 371 (c)(1),
(2), (4) Date: Mar. 11, 2014

(87) PCT Pub. No.: WO2013/050090
PCT Pub. Date: Apr. 11, 2013

(65) Prior Publication Data
US 2014/0346808 A1    Nov. 27, 2014

(30) Foreign Application Priority Data
Oct. 4, 2011  (DE) .......................... 10 2011 114 871

(51) Int. Cl.
*B62D 35/00*    (2006.01)
(52) U.S. Cl.
CPC .................................... *B62D 35/001* (2013.01)
(58) Field of Classification Search
CPC ... B62D 35/001; B62D 35/002; B62D 35/007
USPC .......................................... 296/180.1–180.5
See application file for complete search history.

(56) References Cited

U.S. PATENT DOCUMENTS

| 4,214,787 | A | * | 7/1980 | Chain | ........................ 296/180.4 |
| 4,688,841 | A | | 8/1987 | Moore | |
| 5,375,903 | A | | 12/1994 | Lechner | |
| 6,257,654 | B1 | | 7/2001 | Boivin et al. | |
| 6,309,010 | B1 | * | 10/2001 | Whitten | ..................... 296/180.4 |
| 6,428,084 | B1 | * | 8/2002 | Liss | ........................... 296/180.3 |

(Continued)

FOREIGN PATENT DOCUMENTS

| DE | 102 28 658 | 1/2004 |
| DE | 10 2008 036 888 | 2/2010 |

(Continued)

OTHER PUBLICATIONS

English translation of DE 10 2008 036 888 performed on Oct. 15, 2014.*

*Primary Examiner* — Gregory Blankenship
(74) *Attorney, Agent, or Firm* — Kramer Levin Naftalis & Frankel LLP

(57) ABSTRACT

A rear spoiler device for a vehicle that has a rear door includes an air guiding element configured to attach to a lateral rear zone of the vehicle. The air guiding element can be pivoted between a travel position for contour extension and aerodynamic air guidance with the rear door of the vehicle closed, and a position in which it is hinged inwards with the rear door open. To this end, the air guiding element can be received in a hinge of the rear door, and the rear spoiler device has a spring device that presses the air guiding element in the travel position against a counter-stop formed on the hinge, preferably, on a hinge plate fastened to the rear door.

14 Claims, 2 Drawing Sheets

(56) References Cited

U.S. PATENT DOCUMENTS

| | | | |
|---|---|---|---|
| 6,485,087 B1 * | 11/2002 | Roberge et al. | 296/180.5 |
| 6,854,788 B1 * | 2/2005 | Graham | 296/180.4 |
| 7,950,720 B2 * | 5/2011 | Skopic | 296/180.1 |
| 8,025,329 B1 | 9/2011 | Kron | |
| 8,100,461 B2 * | 1/2012 | Smith et al. | 296/180.4 |
| 8,672,391 B1 * | 3/2014 | Cobb | 296/180.4 |
| 8,708,399 B2 * | 4/2014 | Smith et al. | 296/180.4 |
| 8,820,817 B1 * | 9/2014 | Anderson | 296/180.1 |
| 8,851,554 B2 * | 10/2014 | Wayburn et al. | 296/180.4 |
| 2008/0048468 A1 | 2/2008 | Holubar | |
| 2009/0295189 A1 * | 12/2009 | Distel et al. | 296/180.1 |

FOREIGN PATENT DOCUMENTS

| | | |
|---|---|---|
| DE | 20 2009 015 009 | 2/2010 |
| DE | 20 2009 014 476 | 3/2010 |
| DE | 20 2009 014 510 | 3/2010 |
| DE | 10 2009 014 860 | 10/2010 |
| EP | 1 870 321 | 12/2007 |
| WO | WO 2008/024386 | 2/2008 |
| WO | WO 2010/053409 | 5/2010 |

* cited by examiner

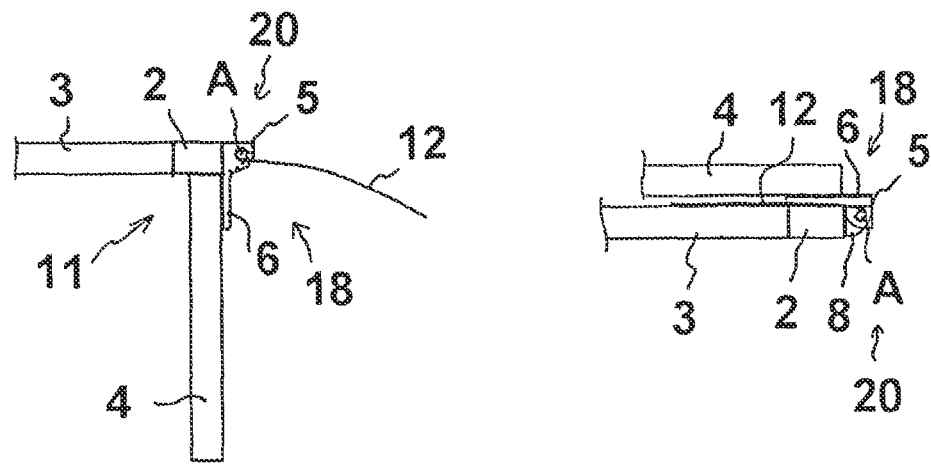
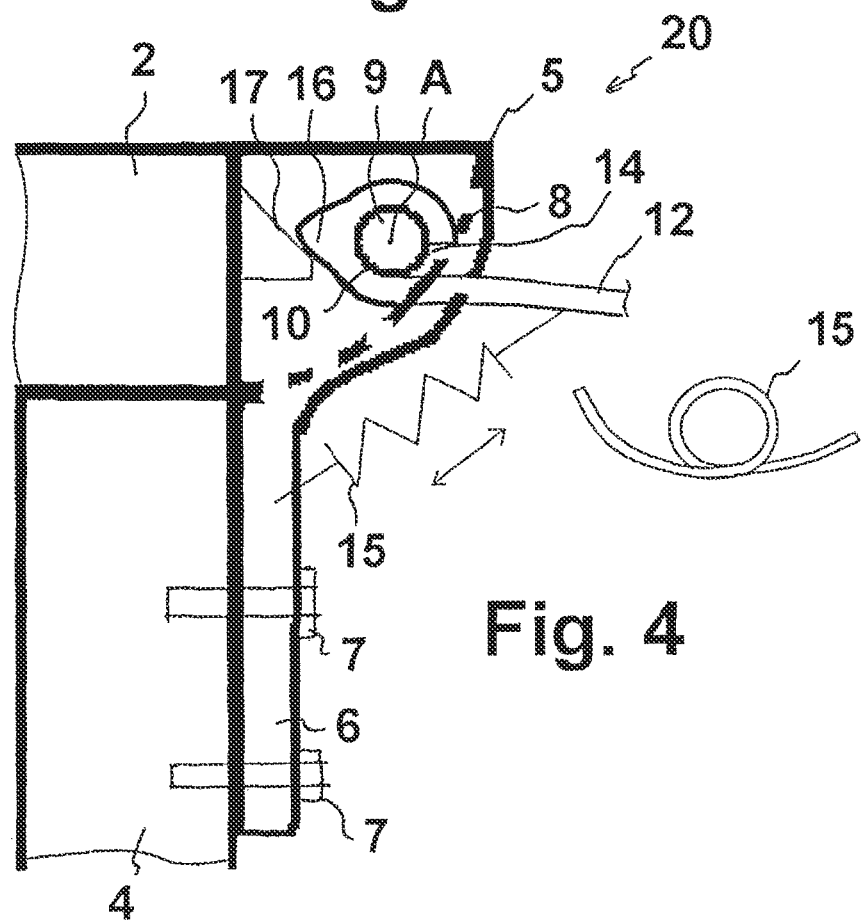

REAR SPOILER DEVICE FOR A VEHICLE

FIELD OF THE INVENTION

The present invention generally relates to a rear spoiler device for a vehicle.

BACKGROUND OF THE INVENTION

Rear spoilers serve to improve vehicle aerodynamics and can, correspondingly, lower fuel consumption. Various approaches to constructing such rear spoilers are known. For example, U.S. Pat. No. 4,688,841 describes a self-inflating structure of film or textile; and U.S. Pat. No. 5,375,903 and WO 2010/053409 describe similar approaches. DE 20 2009 014 476 U1, DE 20 2009 014 510 U1 and DE 20 2009 015 009 U1 describe rear spoilers constructed out of solid materials, in which the spoiler elements are arranged in a displaceable or pivotable manner in order to enable unimpeded opening of the vehicle door.

DE 102 28 658 A1 describes various folding solutions, in which planar faces are pivoted about a hinge. EP 1 870 321 B1 describes an inflatable construction.

DE 10 2008 036 888 A1 describes various constructions of rear spoilers and the connections thereof to the vehicle. In one such construction, a carrier can be fitted between the rear door and the air guiding element. The carrier can be suspended for a substantially pivoted-out position of the door. In place of such a carrier, the use of a flexible carrier having a hollow space is also described. When pivoting a rear flap outward about the vertical pivot axis thereof, the air guiding element is first also pivoted until it reaches the outer face of the side wall of the vehicle. When the rear flap is subsequently pivoted upward, the flexible carrier element is accordingly compressed.

However, such constructions are generally very complex. Thus, complex joint or hinge constructions and connections of the air guiding element to the vehicle door are generally required.

Some rear spoiler devices enable only the use of relatively short air guiding elements, whereby improvement of the aerodynamics is limited.

SUMMARY OF THE INVENTION

Generally speaking, it is an object of the present invention to provide an improved rear spoiler device of relatively simple construction that enables a secure travel position to improve aerodynamics without significantly impairing the functionality of the vehicle's rear door.

According to an embodiment of the present invention, the air guiding element is fitted to the hinge of the rear door. Advantageously, it can be pivoted about the pivot axis of the rear door. To this end, the air guiding element may have, for example, a bearing receiving member with which it is suspended in a bearing pin of the hinge.

Consequently, the air guiding element can be constructed, for example, as an elongated bent plate. The plate can, for example, be bent at an end to form a bearing lug.

The air guiding element is pretensioned into its travel position by a resilient device. By means of a stop, it can be retained in the travel position in which it protrudes, for example, by about 75° with respect to the door and extends the contour of the side wall so that the aerodynamics of the vehicle are improved. The resilient device, consequently, already presses the air guiding element in the travel position. This is in contrast, for example, to the construction described in DE 10 2008 036 888 A1, in which a carrier element having a hollow space retains the air guiding element in the travel position, but is compressed against the side wall only when the rear door is folded out with a restoring force being formed.

The air guiding element according to an embodiment of the present invention is pressed against a counter-stop on the hinge, which is preferably formed on the hinge plate, which can be secured at the door side so that the counter-stop also pivots when the rear door is opened. Consequently, the rear door pivots together with the air guiding element, protruding until the air guiding element abuts the outer side of the side wall. Subsequently, the rear door folds open further so that the resilient device is further tensioned counter to the resilient action thereof.

In this instance, it is possible to fold the rear door from the closed position as far as a position in abutment with the outer face of the side wall, that is, through approximately 270°. The resilient device may be a metal spring, for example, a rotary spring or torsion spring or helical spring, which, in contrast to, for example, a larger carrier element constructed with a hollow space, does not impair the upward pivot movement of the rear flap or rear door.

Advantageously, the construction of the rear spoiler element is cost-effective. It may be implemented, for example, simply with an air guiding element that can be constructed in a cost-effective manner and a resilient device that is, for example, constructed as a metal spring, the stop and the counter-stop being able to be constructed by means of faces on the hinge and the air guiding element.

Also, advantageously, the functionality of the rear door is not impaired; the pivot space of the rear door is not impaired. The air guiding element may be constructed with a greater length since it is received when pivoting inward between the door and side wall and does not protrude forward in a disruptive manner.

Moreover, the position of the air guiding element in the travel position is reliable and secure; if the vehicle driver, for example, should inadvertently park too tightly at the rear, without taking the air guiding element into account, the air guiding element can pivot inward counter to the resilient action where applicable, without becoming damaged.

Functionality is also not impaired in poor weather conditions such as, for example, snow and ice. A solid, cost-effective, mechanical construction is provided with low additional weight and a small number of parts.

In place of a joint or an articulation of the air guiding element on the bearing of the hinge, for example, the air guiding element can be securely connected to the hinge, the air guiding element then advantageously being very resilient or super-resilient, that is, enabling a high level of deformability without material damage or lasting deformation. Consequently, the air guiding element is bent through a greater angular range when the rear door is folded open, and also becomes deformed when the door is folded back. The resilient device is consequently produced by means of a portion of the air guiding element.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The invention is explained in greater detail below with reference to the appended drawings in which:

FIG. 2 is an enlarged view of the connection region of the right-hand rear door with the rear flap being closed according to an embodiment of the present invention;

FIG. 3 is a view corresponding to FIG. 2 showing the rear door completely opened;

FIG. 4 is a detailed enlargement of the door hinge with the connection of the air guiding element according to an embodiment of the present invention.

DETAILED DESCRIPTION OF THE PREFERRED EMBODIMENTS

Figure 1:
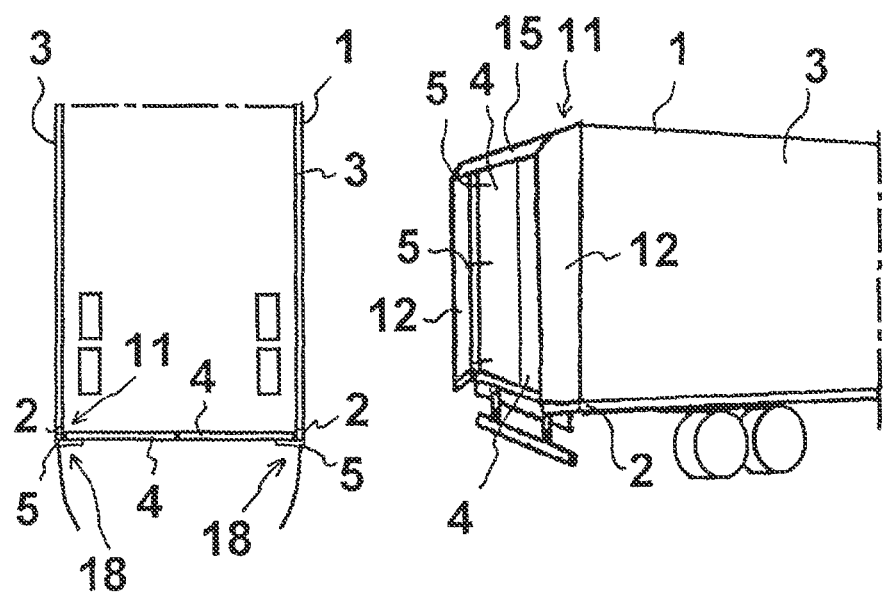
FIG. 1 shows plan and perspective views of a vehicle having two rear spoiler devices in a travel position with the rear doors being closed according to an embodiment of the present invention.

FIG. 1 shows the rear region of a vehicle 1, which can be a driven utility vehicle or a trailer. The vehicle 1 has a vehicle frame 2, which is part of the structure of the vehicle, side walls 3, which are further fitted to the vehicle frame 2, and two rear doors 4 that pivot open laterally. The side walls 3 may be of solid material, as is the case, for example, with box wagons, or flexible or resilient material, such as, for example, with awnings. When the side walls 3 are constructed from solid material, they may also be part of the vehicle frame 2 or the vehicle frame 2 with the side walls 3.

The rear doors 4 are fitted by means of hinges 5 (hinge joints) to the vehicle frame 2 or—when the side walls 3 are constructed in a solid manner—fitted to the side walls 3 in an articulated manner, and are preferably of the same size. They each pivot laterally backward through approximately 270° so that, from the closed position in FIG. 2, they reach the completely open position of FIG. 3 and can be leaned against the outer sides of the side walls 3.

Each rear door 4 is preferably secured to the vehicle frame 2 by means of a plurality of vertically spaced hinges 5. Each hinge 5 has a hinge plate 6 secured to the rear door 4 by way of securing means, for example, screws 7, and a base 8 secured to the vehicle frame 2, and which is shown here with dashed lines. A bearing pin 9 is received in the base 8 or constructed as part of the base 8. The hinge plate 6 is connected, for example, with a bearing lug 10, to the bearing pin 9 and can consequently be pivoted through 270° about a pivot axis A of the rear door. The closed position of the rear door 4 according to FIGS. 1, 2 and 4 is, for example, defined by a stop of the rear door 4 on the vehicle frame 2. The completely opened position of FIG. 3 is defined, for example, by abutment of the hinge plate 5 or of the rear door 4 on the side wall 3, or also abutment of the hinge plate 6 on the vehicle frame 2.

Two rear spoiler devices 18 are fitted to lateral rear regions 11 of the vehicle 1, that is, at the left-hand and right-hand side. They each have an air guiding element 12 comprising, for example, plastic material, such as, for example, polyethylene or polypropylene, or also a metal, which is adjustably fitted to the hinge 5. Each air guiding element 12 is pivotably received in a pivot axis A. Preferably, the air guiding element 12 can be directly suspended on the bearing pin 9, for example, by forming a bearing lug 14. According to the embodiment shown, the air guiding element 12 is produced substantially as a bent plate, which is constructed at one end with an open bearing lug 14 and can be suspended, for example, from above in the bearing pin 9 or also clip-fitted. The air guiding element 12 extends in the travel position toward the rear, for example, at an angle of approximately 75° with respect to the closed rear door 4, and is advantageously curved inward.

Consequently, the two rear spoiler devices 18 with the lateral air guiding elements 12 and, for example, with another air guiding element 15 provided on the roof of the vehicle 1, form a rear spoiler that improves the vehicle's aerodynamic properties, that is, reduces the air resistance. A limitation of the length of the air guiding element 12, with which it extends toward the rear from the pivot axis A, is not required.

Referring to FIG. 4, the air guiding element 12 is pressed into the extended travel position by means of a resilient device 15, in a counter-clockwise direction. The resilient device 15 presses the air guiding element 12 laterally outward in accordance with the pivot movement of the opening of the rear door 4 with the same pivot axis A. In FIG. 4, for reasons of simplification, the action of the resilient device 5 is shown in accordance with a pressure spring; the resilient device 5 itself can be constructed, for example, as shown at the right-hand side as a metal rotary spring or torsion spring, which is suspended, for example, in the bearing pin 9 and which is supported with the members thereof on the air guiding element 12 and the hinge plate 6. In principle, the resilient device 15 may also be part of the air guiding element 12, in which it resiliently deforms itself and forms resilient tension.

A stop 16 is formed on the air guiding element 12. Stop 16 is constructed on a counter-stop 17 of the hinge 5, preferably, of the hinge plate 6, which is secured to the rear door 4. The resilient device 15 consequently presses the air guiding element 12 into the open position or extended position in which the stop 16 abuts the hinge-side counter-stop 17.

When the rear door 4 is opened, that is, when it pivots in the counter-clockwise direction in FIGS. 2 to 4, the counter-stop 17 thereof and the hinge-plate-side connection of the resilient device 15 also pivots with the hinge plate 6 so that the entire air guiding element 12 pivots with the hinge plate 6 until the air guiding element 12 abuts the outer wall 3. Since the air guiding element 12 protrudes by approximately 75° (or, owing to its curved path, sometimes slightly less) from the door wall 4, the air guiding element 12 strikes the outer side of the side 3 in front of the rear door 4. When a pivot angle subsequently remains, the air guiding element 12 is pressed counter to the action of the resilient device 15 against the hinge plate 6 or the rear door 4, which pivots further open. The resilient device 15 consequently gives way without damage occurring to the air guiding element 12 or the hinge plate 6 or the rear door 4.

When the rear door 4 is subsequently closed, the resilient device 15 relaxes again so that the travel position of FIGS. 1, 2 and 4 is reached again.

The rear spoiler device 19 forms a hinge device 20 with the hinge 5.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A rear spoiler device for a vehicle having at least one rear door, the rear spoiler device comprising:
   an air guiding element configured to mount to a lateral rear region of the vehicle, the air guiding element being pivotable between (i) a travel position for contour extension and aerodynamic air guidance when the at least one rear door is closed and (ii) a folded-in position when the at least one rear door is open, the air guiding element being receivable in a hinge of the at least one rear door; and
   a resilient device configured to press the air guiding element away from a rear door of the at least one rear door in the travel position against a counter-stop formed on the hinge that prevents further movement of the air guiding element away from the rear door.

2. The rear spoiler device as claimed in claim 1, wherein the resilient device is a metal spring disposed between the air guiding element and the hinge.

3. The rear spoiler device as claimed in claim 1, wherein the air guiding element includes a bearing receiving member for pivotable bearing in a bearing pin of the hinge, the bearing pin forming a pivot axis of the hinge.

4. The rear spoiler device as claimed in claim 3, wherein the resilient device is a rotary spring configured to bear in the bearing pin of the hinge.

5. The rear spoiler device as claimed in claim 1, wherein the resilient device is tensioned in all positions of the air guiding element and to a greater extent in the folded-in position than in the travel position.

6. The rear spoiler device as claimed in claim 1, wherein the air guiding element is formed from at least on of plastic and metal.

7. A hinge device, comprising:
   a hinge having a hinge plate securable to a rear door of a vehicle, the hinge plate being pivotable through about 270° with respect to the base about a pivot axis from a closed position of the rear door into an open position of the rear door for abutment with a side wall of the vehicle; and
   the rear spoiler device as claimed in claim 1, wherein the air guiding element is pivotably received in the pivot axis, the resilient device is received between the guiding element and the hinge, and the air guiding element in the closed position of the rear door presses against a counter-stop of the hinge.

8. The hinge device as claimed in claim 7, wherein the air guiding element is pivotably supported in the pivot axis with respect to both the base and the hinge plate.

9. The hinge device as claimed in claim 8, wherein the base includes a bearing pin, and wherein both the hinge plate and the air guiding element are pivotably received in the bearing pin.

10. The hinge device as claimed in claim 8, wherein the resilient device is tensioned between the hinge plate and the air guiding element.

11. The hinge device as claimed in claim 10, wherein the air guiding element is, in all positions of the hinge plate, pressed by the resilient device against the counter-stop.

12. A vehicle, comprising:
    two rear doors that are pivotable (i) open laterally through about 270° and (ii) between a closed position and open position for abutment with side walls of the vehicle, wherein each door of the two rear doors is connected in an articulated manner by the hinge device as claimed in claim 7, and wherein the air guiding element and a further air guiding element in travel position with the rear doors closed protrude toward the rear of the vehicle for contour extension and aerodynamic air guidance.

13. A rear spoiler device for a vehicle having at least one rear door, the rear spoiler device comprising:
    an air guiding element configured to mount to a lateral rear region of the vehicle, the air guiding element being pivotable between (i) a travel position for contour extension and aerodynamic air guidance when the at least one rear door is closed and (ii) a folded-in position when the at least one rear door is open, the air guiding element being receivable in a hinge of the at least one rear door; and
    a resilient device configured to press the air guiding element in the travel position against a counter-stop formed on the hinge, wherein the air guiding element includes a stop for resiliently pretensioned abutment on the counter-stop of the hinge.

14. A rear spoiler device for a vehicle having at least one rear door, the rear spoiler device comprising:
    an air guiding element configured to mount to a lateral rear region of the vehicle, the air guiding element being pivotable between (i) a travel position for contour extension and aerodynamic air guidance when the at least one rear door is closed and (ii) a folded-in position when the at least one rear door is open, the air guiding element being receivable in a hinge of the at least one rear door; and
    a resilient device configured to press the air guiding element in the travel position against a counter-stop formed on the hinge, wherein the air guiding element is a bent plate having an open bearing lug.

* * * * *